United States Patent [19]

Willetts

[11] 4,030,738
[45] June 21, 1977

[54] TANDEM AXLE VEHICLE SUSPENSION SYSTEM

[76] Inventor: Elwood H. Willetts, 102 S. Penataquit Ave., Bay Shore, N.Y. 11706

[22] Filed: July 19, 1976

[21] Appl. No.: 706,730

[52] U.S. Cl. .............................. 280/681; 267/21 A; 280/683
[51] Int. Cl.² .......................................... B60G 5/04
[58] Field of Search .......... 280/676, 681, 682, 683, 280/687; 267/21, 35, 63

[56] References Cited

UNITED STATES PATENTS

| 2,367,220 | 1/1945 | Knox | 280/683 X |
| 2,442,354 | 1/1948 | Gordon | 280/683 |
| 3,003,781 | 10/1961 | Black | 280/683 |

FOREIGN PATENTS OR APPLICATIONS

| 1,220,845 | 1/1960 | France | 280/678 |
| 461,583 | 2/1937 | United Kingdom | 280/687 |

Primary Examiner—Philip Goodman
Attorney, Agent, or Firm—Paul J. Sutton

[57] ABSTRACT

The present invention discloses a multiple axle articulated suspension structure and system for vehicles wherein road and tire excitations of each axle are isolated from their opposing axle, as well as from the sprung mass. This is accomplished via deflections of pressure-resistant spring means and load-equalizing supports. In a preferred embodiment of this invention, a tandem axle vehicle suspension system having separately trunnioned rocker beam assemblies supported by cross axles is secured in a novel manner to a combination of self-dampening multiple spring means wherein, while each component spring means is not self-dampening, each combination thereof is self-dampening, and wherein air, elastomeric and hydraulic spring means are combined in a number of combinations thereof. Both air and hydraulic spring arrangements are contemplated, where the air spring is supplied with air at varying pressures which are a function of the load on the suspension, and wherein a height gauge located between the axle and the frame controls this pressure. An elastomer serves both to partially dampen the air spring, as well as to provide load deflection resistance to an undersized air spring. A hydraulic system dampens the air spring. Other embodiments are disclosed.

2 Claims, 5 Drawing Figures

TANDEM AXLE VEHICLE SUSPENSION SYSTEM

This invention relates generally to suspension structures for use with multiple axle vehicles, and more specifically this invention relates to a composite, elastomerically damped suspension structure for tandem axles, which exhibits a progressively increasing spring rate under and when subjected to increasing loads.

The subject matter of my U.S. Pat. No. 3,856,325, granted on Dec. 24, 1974, is incorporated by reference within this specification. In addition, my U.S. Pat. No. 3,572,745, granted on Mar. 30, 1971, is to be incorporated by reference within this application the latter being a continuation-in-part of application Ser. No. 721,558, filed Apr. 1, 1968, now abandoned, and application Ser. No. 649,502, filed June 28, 1967, now abandoned.

A suspension system contemplated by one embodiment of this invention includes a vehicle frame which is supported by a bracket depending downwardly from the frame. The bracket is supported by a pair of rocker beams having horizontal and vertical components. The horizontal components of the rocker beam are supported by a pair of laterally extending vehicle axles by any suitable means.

In the present invention, an air spring is employed to which air is supplied at varying pressures, depending upon the load on the suspension. A relatively simple height gauge located between the axle and frame senses and controls the pressure. An elastomer both provides load deflection resistance to an undersized air spring and dampens the air spring. A hydraulic system may also be used to dampen the air spring.

The present invention that will be described within this specification and accompanying drawings applies particularly to a suspension system for a short wheel base bogie of a truck-tractor, rather than the so-called wide spreads or extended wheel bases or special length trucks. As now used, air suspensions on conventional truck-tractors comprise a short beam hinged below the vehicle frame and supported by a cross axle, with an air spring disposed outwardly of the axle between the top of the beam and the underside of the frame. The support beam simply does not afford sufficient transverse vertical freedom to the axle, as is obtained with other suspensions, nor is there proper load equilization between the axles.

Air springs have not been used on truck-tractors having separately trunnioned and oppositely disposed rocker beams restrained against load deflection by a compressive spring means disposed between the vertically extending components of the rocker beams. This has been due to the fact that designers have not found adequate space for the air spring system. Furthermore, the interconnecting prop shaft of a tractor extends longitudinally within the frame, which precludes the arrangement taught by U.S. Pat. No. 3,003,781 for trailers, granted to Black.

With the loaded height of a frame restricted to 38 inches, in order to enable fifth wheel engagement with the trailer, this space in a 50 inch wheel base bogie, with sufficient articulation clearance at the tires, enables but a 9-inch diameter air spring with a 3600 pound capacity. In order to clear the fifth wheel, the 9-inch air spring may be disposed or located approximately 20.5 inches over the trunnion assembly which, in turn, is 21 inches from the axle. In such an arrangement, the air spring will supply but 49 percent of the 7200 pound unsprung wheel load.

According to one aspect of the present invention, a novel arrangement of a spring means over and between the tires of adjacent axles will provide deflection reaction on both axles, while enabling the isolation of excitations of each axle from the sprung mass and from the opposing axle, thus preventing resonance and resultant wheel hop.

A comparison of some 37 tractor suspensions shows that the average price and weight of 25 leaf-type spring suspensions is approximately $554 and 1,018 lbs. The price and weight for 12 air spring suspensions averages $513 more and 88 lbs. more than for a leaf spring suspension. Yet, air suspensions that are currently in use simply lack equalization of load between the axles and further lack equalization of the load between opposite ends of an axle until the increased load torsionally deflects the support beam, or a track baris installed transversely for each axle.

The present invention overcomes disadvantages and drawbacks of prior art attempts to solve the aforesaid problems by providing a basic suspension system or structure to which a number of different spring means may be applied.

A spring means arrangement includes an elastomer-supported air spring arrangement wherein the air spring and the elastomer are disposed in parallel with respect to one another and wherein both the air spring and the elastomer are reactive on both axles. This embodiment of the invention is most beneficial where restricted control of frame deflection is required throughout the load range of the suspension. The parallel arrangement of the air spring and elastomer affords the required spring force within the space limitations available in a short wheel suspension. In this arrangement, the hysteresis of the elastomer serves to dampen the fluctuations or excitations induced within the elastomer. The air spring affords control of the frame height through air pressure which is varied, depending upon the load on the suspension. A gauge located between the axle and frame controls air pressure to the air spring. Fluctuations of the air spring are damped hydraulically, either in series or parallel with the elastomer.

Another arrangement includes an elastomer in series with an air spring which is remotely disposed within the suspension structure, and which is hydraulically interconnected with the elastomer so that the elastomer dampens the excitations of the axles on the hydraulic system to prevent what is commonly referred to as the "water hammer" effect. The restrictions of the hydraulic system dampen the fluctuations in the air spring, which affords relative frame height control.

Still another embodiment of my invention is useful where both frame deflection control and the ultimate in critical damping is required. In this case, the combination of an air spring disposed in parallel relationship with respect to a first elastomer between the rockers and a first hydraulic cylinder is utilized in cooperation with a remotely disposed second hydraulic cylinder which is supported by a second elastomer adjacent to and in series with this second hydraulic cylinder. Thus, the first and second elastomers function in series relationship, while the first and second hydraulic cylinders are interconnected by a hydraulic line. The elastomers serve to cushion the impacts on the momentarily inert hydraulic mass which, in turn, then moves in a predetermined velocity to dampen the movement of the rockers, while the total deflection of the rockers equals the sum of the deflections of the elastomer and hydraulic strokes. This arrangement is best shown in FIG. 5, as will be described in detail below.

As best illustrated in FIG. 4, in another form of the invention an elastomer and a hydraulic cylinder are located between vertical rockers in series relationship with respect to one another and disposed axially. A second hydraulic cylinder located remotely from the first hydraulic cylinder and in series with an air spring is interconnected with the first hydraulic cylinder by a hydraulic line. In this form of the invention the elastomer is in series with the air spring and impulses are dampened by the restriction in flow between the first and second hydraulic cylinders. In this form of the invention, the impact of the rocker beams on the hydraulic system is damped by deflection of the elastomer in series with the first hydraulic cylinder. The total spring force here is provided by the air cylinder located transversely in the only adequate space available for exclusive air spring capacity in a short wheel base suspension. This combination functions in a novel manner to preserve axial alignment of the adjacent free ends of the air spring and hydraulic cylinders.

The advantages of this suspension structure, which are common to all of different spring means arrangements just described, enable an economy of both cost and weight. In addition, the spring forces are on each transverse side of the suspension structure and are reactive on both axles, thus requiring but two, instead of four, air springs. Four air springs are commonly employed with conventional suspension structures known to the prior art.

It is an object of the present invention to provide a suspension system of the novel type just described above.

Another object of the present invention is to provide a suspension system wherein the deflection restraint of a partial capacity air spring is supplemented with either a partial capacity elastomer, or another air spring, or a compressive steel spring, arranged in parallel and reactive on both axles.

Another object of the present invention is to provide a suspension system wherein an air spring is disposed remotely within the suspension structure, transversely of the vehicle length and between the axles, but which yet functions in a series with an elastomer compressively restrained between the opposing faces of rocker beams. This feature of the present invention contemplates the hydraulic interconnection of the elastomeric and air-type springs whereby the elastomer dampens the excitations of the axles on said hydraulics, while the same hydraulics are restrained to dampen the pulsations of the air spring within the same suspension system. This enables the structure to better withstand the impacts on the tractor fifth wheel from a high-frequency trailer suspension.

Still another object of the present invention is to provide one or more rolling-sleeve cylinder air spring arrangements to the rolling-sleeve type of hydraulic cylinder, whereby the axial alignment of both of the rolling sleeve-type cylinders is preserved throughout their operational stroke or travel.

A still further object is to provide a suspension structure employing a multiple of spring means wherein vertical freedom at opposite ends of each axle is realized throughout the load range, as with all leafspring suspension known to the art.

Yet another object of this invention is to provide reactive springs means which serves to isolate the sprung mass from the excitations of each axle, as well as from the opposing axle.

Still a further object is to provide a multiple spring arrangement wherein axial alignment of the spring elements is preserved, while reducing the cost, weight and complexity of the tandem axle vehicle suspension while all the time improving the performance characteristics of the suspension system over what is commonly realized in presently known air suspensions.

The invention will be more clearly understood from the following description of specific embodiments of the invention, together with the accompanying drawings, wherein similar reference characters denote similar elements throughout the several views, and in which.

Before referring in detail to the various drawings listed above, it will be worthwhile here to once again characterize my invention by referring to a system provided by me wherein a basic suspension structure is provided to which any combination of four or more different types of spring means may be applied. More specifically, a self-dampening elastomer may be provided in combination with other types of spring means, wherein the spring rate is controlled by varying air pressure, thereby enabling a relatively soft ride at empty load conditions and a higher spring rate resistant to transverse roll of relatively highly-centered or located loads.

A second type of spring combination includes an elastomer-supported air spring arrangement, in parallel configuration and reactive on both axles of the suspension structure, with the hysteresis characteristics of the elastomer further serving to dampen the fluctuations of the air spring, which affords relative frame height control.

A third arrangement is also provided by the present invention, wherein an elastomer is arranged in series with an air spring disposed remotely within the suspension structure, and hydraulically interconnected with the elastomer, so that the elastomer dampens the excitations of the axles, which may be induced by road conditions, on the hydraulic system, to prevent what is commonly referred to as "water hammer" effect. Furthermore, restrictions in the hydraulic system dampen fluctuations in the air spring.

A fourth arrangement is further provided, wherein the combination of an air spring in parallel with a first elastomer between the rockers and a first hydraulic cylinder adjacent to and in series with the first elastomer, and a remotely disposed second hydraulic cylinder supported by a second elastomer adjacent to and in series with the second cylinder. In this arrangement the first and second elastomers function in series, with the first and second hydraulic cylinders interconnected by a hydraulic line, or the like.

The advantages of this suspension structure system, wherein different spring means may be applied, include an economy of both cost and weight. These benefits are realized by any and all four of the above-referenced spring means combinations. In addition, the spring force on each transverse side of the suspension structure is reactive on both axles, thus enabling the use of but two (rather than four) air springs. Conventional designs require four air springs which add to the weight and cost. Additional benefits reside in the resilient equalization of load between opposing axles.

Figure 1:
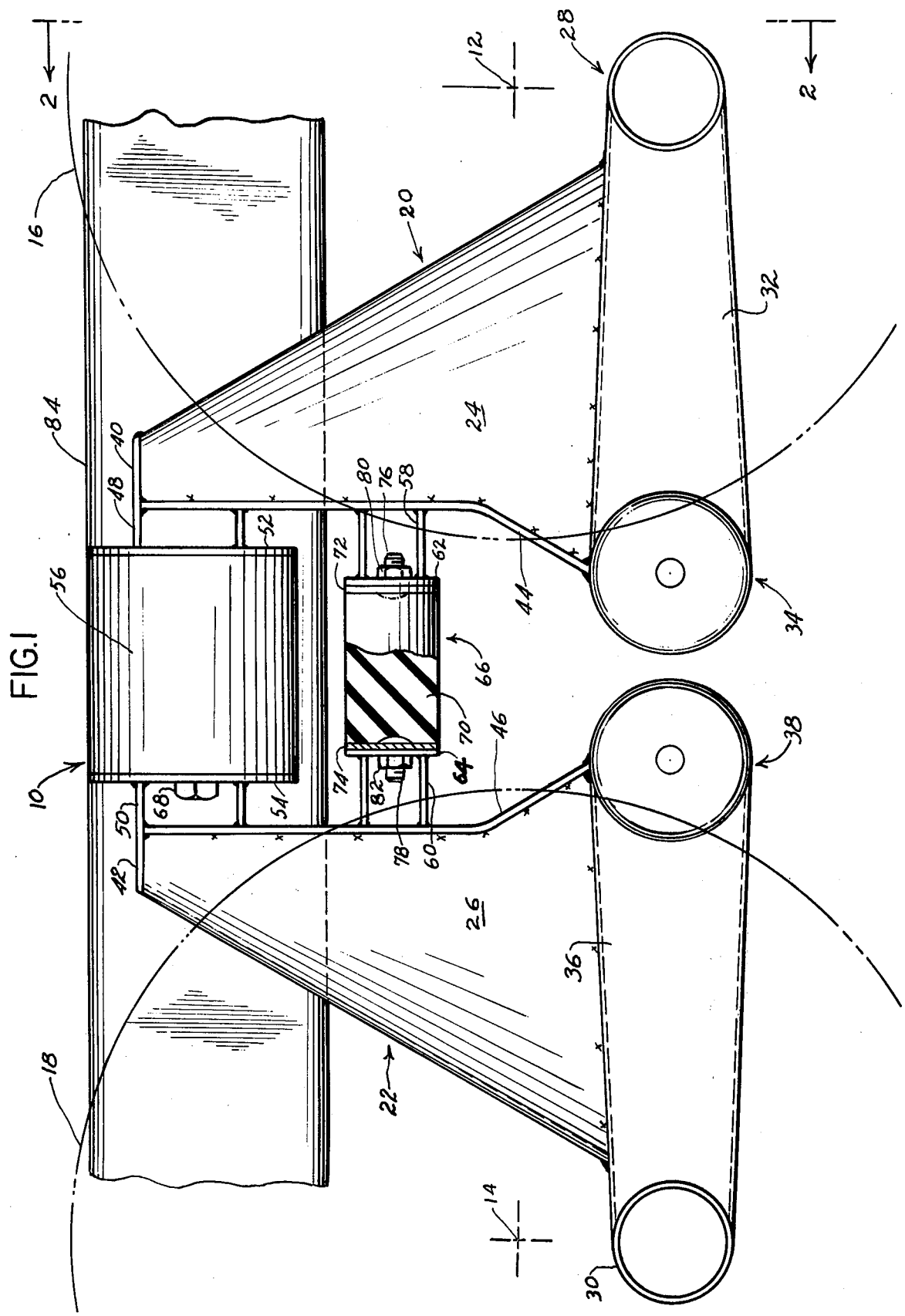
FIG. 1 is a fragmentary sectional elevational view of one embodiment of the present invention, whereby a combination of spring means are utilized, namely elastomeric spring means and air-type spring means.

Referring now in more detail to the specific drawings provided with this application, FIG. 1 illustrates in a sectional elevational-type view, a combination of elastomer and spring means whereby the elastomer virtually supports in parallel configuration the spring means located thereabove. A suspension system 10 includes a pair of axles 12 and 14, respectively, which are spaced longitudinally along the axis of the vehicle with supporting wheels 16 and 18 shown in phantom outline. By my use of the word "wheel" in describing wheels 16 and 18, the reader should keep in mind that this use of the phrase refers to the outside diameter of 10.00–20 tires in each case, as reflected by the phantom outline.

Suspension system 10 consists of an over-all structure which includes rocker beam assemblies 20 and 22, each possessing beams 24 and 26, respectively. Beams 24 and 26 are trunnioned in bushing assemblies 28 and 30, respectively, each of these bushing assemblies being carried by the hanger brackets of types illustrated in previous of my patents nd referred to as axle hanger brackets (not shown with a reference character in these drawings). While the heart of the present invention does not reside in the specific makeup and structure of bushing assemblies 28 and 30 of the present invention, it should be noted that these bushing assemblies are deflectable radially, torsionally and axially.

Referring now to the makeup of the structure of rocker beam assemblies 20 and 22, it can be seen in FIG. 1 that a horizontal component rocker beam member 32 interconnects by a welded attachment bushing assembly 28 and a trunnion assembly 34. Similarly, a horizontal component rocker beam member 36 interconnects bushing assembly 30 with a trunnion assembly 38. It can be seen from FIG. 1 that bushing assemblies 28 and 30, as well as trunnion assemblies 34 and 38, lie along a common center line which extends substantially horizontally of suspension system 10.

Rocker beam assemblies 20 and 22, in addition to the horizontal component members 32 and 36, further include vertically extending or upstanding beams 24 and 26 which extend from members 32 and 36, respectively, to upper ends 40 and 42 thereof, respectively. Beams 24 and 26 include vertically extending and oppositely extending or opposed faces 44 and 46, respectively. Faces 44 and 46 extend upwardly from inclined portions of beams 24 and 26 to upper ends 40 and 42 of these same beams.

Rocker beam assemblies 20 and 22 further include as part of beams 24 and 26, inwardly extending members 48 and 50, which extend toward one another and which are integral with opposite end plates 52 and 54 of an air spring assembly 56.

Also attached to beams 24 and 26, which comprise the vertical components of rocker beam assemblies 20 and 22, are opposed and inwardly projecting members 58 and 60 which extend to and into integral welded contact with opposed face plates 62 and 64 of the opposite ends of an elastomeric assembly 66.

Figure 2:
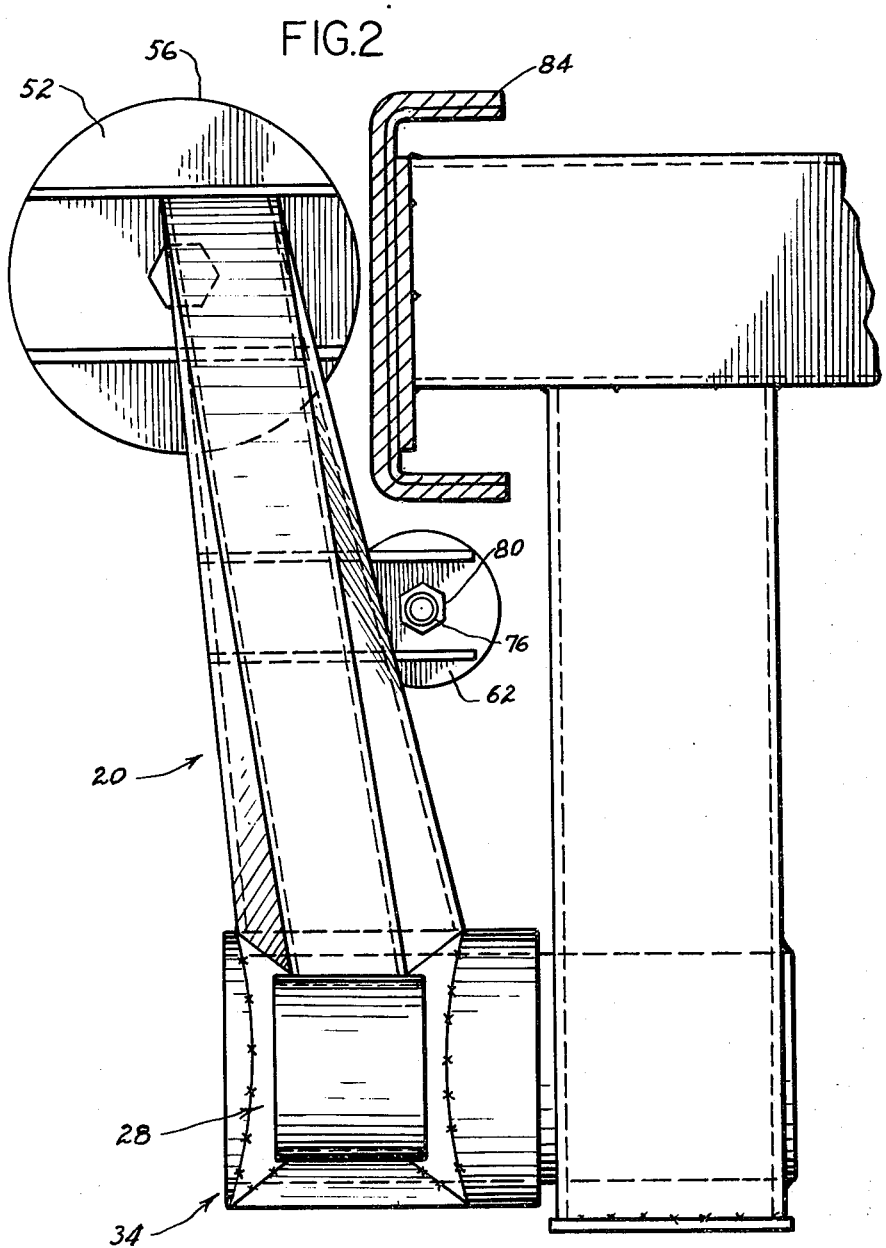
FIG. 2 is a fragmentary sectional elevational view taken along line 2—2 of FIG. 1 with the addition of an hydraulic shock absorber disposed in parallel with the air spring and elastomer, to dampen the spring.

In a preferred embodiment of the present invention of the design shown in FIGS. 1 and 2, all of the structural elements that have been described so far are preferably welded together, using continuous welds which exhibit the full strength characteristics of the metals, in this case SAE 950 steel.

Referring now to the "spring means" utilized within suspension system 10, we see in FIGS. 1 and 2 an air spring assembly 56 disposed and supported above an elastomeric assembly 66. The present invention contemplates the use of air spring assembly 56 for operationally equalizing the load as between axles 12 and 14, with elastomeric assembly 66 serving both to dampen excitations induced in air spring assembly 56 and to supplement the forces of the air spring. An inlet conduit 68 is shown on the left most side of air spring assembly 56 and serves as means for providing air to air spring assembly 56.

Air spring assembly 56 is preferably of a 9-inch diameter, and of a length of approximately ten inches at design conditions. With a maximum deflection of 7.6 inches, assembly 56 will exhibit characteristics of 3600 pounds at a 4-inch deflection. As for its disposition, the center of air spring assembly 56 is preferably disposed at approximately 7 inches from each of opposing faces 44 and 46 at design condition.

Referring now to elastomeric assembly 66, we see in FIG. 1 an elastomeric member 70 which extends between and in bonded contact with plate members 72 and 74. Outwardly and oppositely extending bolts 76 and 78 are preferably bonded such that their heads are integral with plate members 72 and 74. When inserted through openings in face plates 62 and 64, they are capable of receiving nuts 80 and 82 which, when tightened, firmly and securely hold plate members 72 and 74 integral with and against face plates 62 and 64, respectively.

At design conditions, elastomeric member 70 is preferably seven inches long or thereabouts, and exhibits characteristics of 6450 pounds at a deflection of 2.31 inches.

Where the hysteresis of an elastomer is not sufficiently high to dampen both the elastomer and the air spring, a conventional shock absorber may be disposed in parallel relationship to the elastomer and outwardly thereof, as shown in FIG. 2. Where so used, it is reactive on both axles, thus but two such shocks are required with this spring system, while four such larger shocks are required with known air spring suspensions.

As shown in FIG. 2, elastomeric member 70 and its associated components of elastomeric assebmly 66 are preferably disposed substantially beneath frame 84 of suspension system 10, while air spring assembly 56 is disposed or located outboard of frame 84 and at a relative elevation with respect to frame 84 best seen in FIG. 2. In the embodiment of the invention shown in FIGS. 1 and 2, the approximate distance of the top of frame 84, a channel member shown in FIG. 2, to the ground on which tires 16 and 18 rest, is 38 inches. With a suspension structure having a 50 -inch wheel base, this system 10 is able to accommodate at each bushing assembly 28, 30 a sprung load of 7200 pounds.

Figure 3:
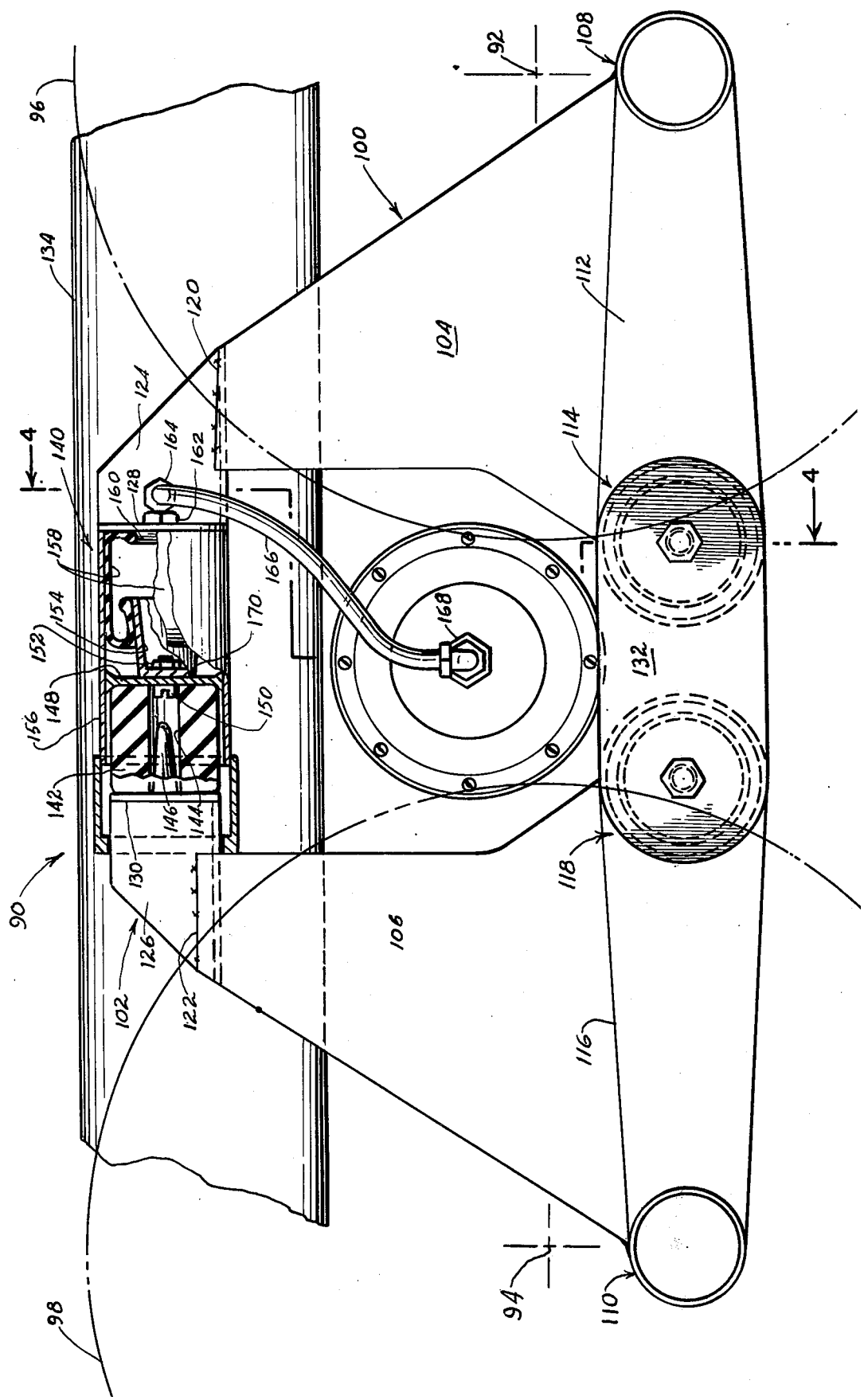
FIG. 3 is a fragmentary sectional elevational view of another embodiment of the present invention, wherein a combination of spring means are utilized, and wherein these spring means comprise a combination of elastomeric and air spring means, arranged in series, with the air spring remotely disposed from the elastomer, and hydraulically connected therewith.
Figure 4:
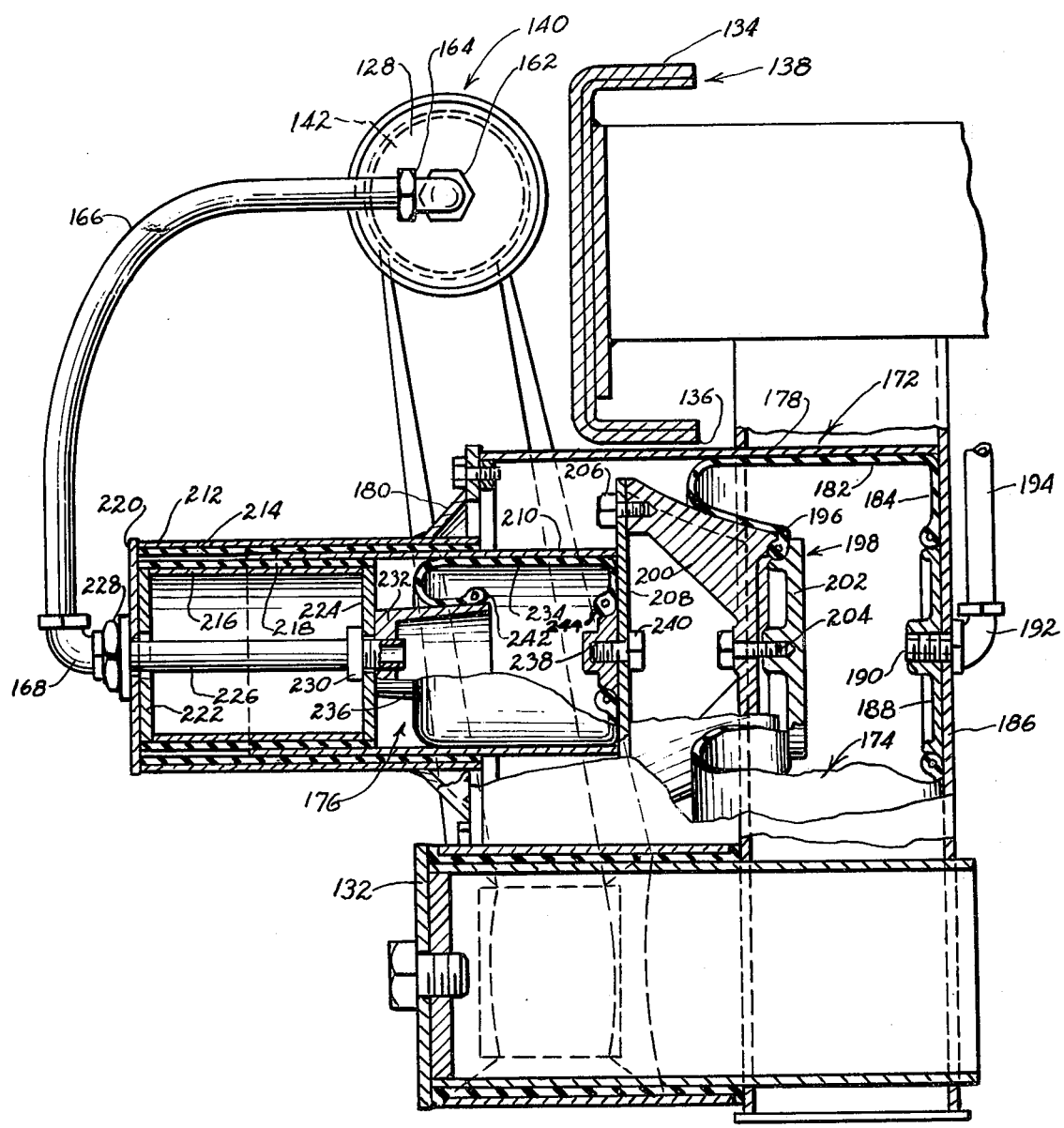
FIG. 4 is a fragmentary sectional elevational view looking along line 4—4 of FIG. 3.

The reader's attention is now directed to another embodiment of the present invention, wherein yet another combination of spring means are provided to effect the desired result elaborated upon within this specification. More specifically, FIGS. 3 and 4 illustrate a suspension system 90 which includes a pair of axles 92 and 94 which are spaced longitudinally along the axis of the vehicle with supporting wheels carrying tires 96 and 98, shown in phantom outline within FIG. 3. As in the case for the embodiment of the invention described above for FIGS. 1 and 2, the phantom outline of tires 96 and 98 represents the outside diameter of 10.00-20 tires.

Suspension system 90 consists of an over-all structure which includes rocker beam assemblies 100 and 102, each possessing beams or beam members 104 and 106, respectively. Beams 104 and 106 are trunnioned in bushing assemblies 108 and 110, respectively, each of these bushing assemblies being carried by hanger brackets of types illustrated in previous of my patents and referred to as axle hanger brackets in the trade. These axle hanger brackets have not been designated reference characters in these drawings. While the heart of the present invention does not reside in the specific makeup and structure of bushing assemblies 108 and 110 of the present invention, as has already been stated for suspension system 10, it should be noted again that these bushing assemblies are deflectable radially, torsionally and axially.

Referring now to the makeup of the structure of rocker beam assemblies 108 and 110, it can be seen in FIG. 3 that a horizontal component rocker beam member 112 interconnects by a weldment the bushing assembly 108 and trunnion assembly 114. Similarly, a horizontal component rocker beam member 116 interconnects bushing assembly 110 with a trunnion assembly 118. FIG. 3 best illustrates the fact that bushing assemblies 108 and 110, as well as trunnion assemblies 114 and 118, lie along a common center lines which extends substantially horizontally with respect to suspension system or structure 90.

Rocker bean assemblies 100 and 102, in addition to including the horizontal component members 112 and 116, further include the aforesaid vertically extending or upstanding beams 104 and 106, which extend from members 112 and 116 upwardly to upper beams ends 120 and 122, respectively. Upper beam ends 120 and 122 are secured, such as by welding or other conventional securing means, to inwardly directed and opposed mounting plates 124 and 126. Mounting plates 124 and 126, respectively, support vertically extending opposing face plates 128 and 130, respectively. The spring means supported by and disposed between face plates 128 and 130 will be described in a bit more detail below. It should be noted here that trunnion assemblies 114 and 118 are tied together by means of a tie plate 132. So that the reader gains a proper perspective of the location of the spring means being described for the present invention, and more specifically the embodiment shown in FIGS. 3 and 4, the top 134 and bottom 136 of vehicle frame 138 are shown in FIGS. 3 and 4 so that the relative disposition of the spring means elements can be seen.

As in the case already described for suspension system 10, the horizontal component members 112 and 116 and their upstanding vertical component beams 104 and 106, respectively, are secured rigidly together such as by welding or other conventional means, as is the attachment between beams 104 and 106 and their upper mounting plates 124 and 126, respectively.

Located between and cooperating with face plates 128 and 130 in an actuating assembly 140, which comprises elastomeric and hydraulic means as components thereof. More specifically, referring to the component elements thereof, an elastomeric member 142 extends substantially horizontally and is formed with a central bore or opening 144 therethrough. Bore or opening 144 accommodates and cooperatively receives a pilot member 146 which extends horizontally from and integrally with face plate 130 into bore 144. Pilot member 146 serves to captively maintain alignment of elastomeric member 142 such that it is not undesirably deformed during operation of the spring means comprising actuating assembly 140. Elastomeric member 142 is bonded to a spacer plate 148 along the left side thereof, as viewed in FIG. 3, and operates in series with the hydraulic means.

A substantially central opening within spacer plate 148 accommodates the shank of a locating bolt 150, whose head is situated within bore 144 of elastomeric member 142. Bolt 150 extends into mating engagement with the flange 152 of a cone 154, disposed horizontally and substantially centrally within an outer sleeve 156. Sleeve 156 extends inwardly of a larger diameter sleeve (not numbered) secured to the face of beam 106, for extrusion of dirt.

An hydraulic cylinder member 158 in the form of a flexible diaphragm member is secured about a central opening 160 to face plate 128. Central opening 160 communicates with a port 162 formed in face plate 128 through which hydraulic fluid is able to pass with the help of a fitting 164. Fitting 164 communicates with an hydraulic line 166 which extends from fitting 164 to a fitting 168 that will be described in more detail below.

The end of hydraulic cylinder member 158 opposite that which defines opening 160 is secured to an outer annular surface 170 of cone 154. Hydraulic cylinder member 158 is restrained by outer sleeve 156, which serves to coaxially align the various cooperative members disposed therewithin. Alternate roller bushing embodiments are contemplated by the present invention.

Referring now to FIG. 4, a remote spring means assembly 172 with which hydraulic line 166 communicates, consists of an air spring subassembly 174 which cooperates with and is secured to an hydraulic subassembly 176.

A separable canister assembly consists of a relatively stationary canister portion 178 which is interconnected with a removable canister portion 180. These are best seen in fragmentary sectional elevation in FIG. 4 of the drawings. An air spring cylinder or diaphragm member 182 is captively maintained within canister portion 178 and extends from a first end 184 which is welded or integral with vertically extending end 186 of canister portion 178. End 184 of cylinder 182 extends annularly about a substantially central pneumatic fitting plate 188, which is likewise held integrally with end 186 of canister portion 178. Fitting plate 188 is equipped with a central opening 190 defined by female threads which accept the male threads of an external fitting 192 which, in turn, communicates with a 100 psi. pneumatic airline 194.

Air spring cylinder or diaphragm member 182 extends from this end 184 just described to an opposite end 196 which, in turn, is secured to and is held by a movable spacer subassembly 198. Spacer subassembly 198 includes an annular hub portion 200 to which an end cap 202 is held by means of a central bolt 204. The annular end 196 of air spacing cylinder or diaphragm member 182 is sandwiched between end cap 202 and hub 200 by means of compressive forces between these elements of spacer subassembly 198. At its opposite or leftmost end, as viewed in FIG. 4, spacer subassembly and its hub 200 is secured by means of bolts 206 to a spacer plate 208. The outer configuration of air spring cylinder or diaphragm member 182 is defined by the inner cylindrical surfaces of canister portion 178. Other than opening 190 already described above as being defined by fitting plate 188, the confines within air spring cylinder 182 are sealed or air-tight, such that increases in pressure as a result of the introduction of air into cylinder 182 by means of line 194, will result in a movement of spacer subassembly 198 to the left under this pressure. Members 196, 198, 200 and 202 are all components of air spring 172.

A horizontally extending sleeve member 210 is secured to the left side of spacer plate 208 as viewed in FIG. 4, and this sleeve member extends substantially coaxially within portions of a sleeve member 212 which, in turn, is secured to removable canister portion 180. A low-friction liner 214 separates sleeve members 210 and 212, and facilitates relatively easy sliding of sleeve member 210 within sleeve member 212. A central cylinder member 216 extends, in turn, coaxially within portions of sleeve members 210 and 212 and is separated at its outer cylindrical surfaces from sleeve member 210 by means of a low-friction liner 218. Cylinder member 216 extends at its leftmost side as viewed in FIG. 4 from an end plate 220 and a spacer ring 222 to its rightmost end where it terminates in integral welded contact with a plate 224.

Hydraulic line 226 is interconnected by fitting 228 to elbow fitting 168, already described. Hydraulic line 226 is secured, such as welding, to a collar 230 which includes an elongated portion carrying male threads which extends through a central opening within plate 224. The threads of collar 230 matingly engage the female threads formed within a central mounting hub 232, which is held integral with plate 224 by means of these same threads. In a preferred embodiment of the present invention, mounting hub 232 is disposed substantially centrally and coaxially with respect to sleeve member 212.

The components of the present invention disposed within sleeve members 210 and 212 and contained within removable canister portion 180 comprise a part of hydraulic subassembly 176. Also included within subassembly 176 is a hydraulic cylinder member or diaphragm member 234 which rests against the inner surfaces of sleeve member 210 at its midsection. At its leftmost side, hydraulic cylinder or diaphragm member 234 is secured to an annular outer surface 236 of mounting hub 232. At its rightmost side, member 234 is held about a retainer plate 238 which, in turn, is held integral with spacer or bolt plate 208 by means of a bolt 240. For purposes of reference, the left side of hydraulic cylinder member 234 has been designated reference character 242, while the right side is 244.

It should be noted here that the folded-over configuration of hydraulic cylinder member 234, air spring cylinder member 182 and hydraulic cylinder member 158, all associated with suspension system 90, facilitates an expansion capability, whereby a piston-like capability is facilitated.

In operation, the suspension system 10 shown in FIGS. 1 and 2 and described in detail above, serves to accomplish an end that has been sought by many of my previous patents, namely to equalize and isolate road-induced excitations in one axle from another axle within the suspension. In suspension system 10, as the axles are deflected upwardly, and as excitations are induced in each, the rocker beam assemblies 20 and 22, together with their component beam members, pivot about the axes of trunnion assemblies 34 and 38 such that the air spring assembly 56 takes or absorbs much of the load. It is an object of this invention to prevent the transmission of forces from one axle to the other axle, namely from axle 12 to axle 14, for example. The air spring assembly 56 and the elastomer assembly 66 each serves to isolate them. The air spring is here disposed to best utilize the greater compressibility of air than of an elastomer, which latter would overheat from hysteresis if flexed at the greater displacement of the air spring, although the frequency is the same. However, there will be undamped excitations induced within air spring assembly itself and it is desired to dampen these excitations. It is here that elastomeric assembly 66 comes into play. Assembly 66, with its elastomeric member that exhibits a progressively increasing spring rate with increasing load, serves to dampen the excitations within air spring assembly 56, and to provide the user of suspension system 10 with a smooth and comfortable ride. Where air spring damping required exceeds the hysteresis of an elastomer, (for a given distribution of total spring load) a conventional shock absorber is contemplated, disposed as shown on FIG. 2.

Referring now to FIGS. 3 and 4, suspension system 90 works in a different way. Upon pivoting of rocker beam assemblies 100 and 102 about their respective trunnion assemblies 114 and 118, the spring means disposed between face plates 128 and 130 will be caused to be compressed. However, the hydraulic cylinder 158 which is disposed in series with the elastomeric member 142 communicates with spring means assbmely 172 remote therefrom.

Pneumatic air pressure is introduced through line 194 into air spring cylinder 182 of air spring subassembly 174 such that the series arrangement of the hydraulic subassembly 176 and the air spring subassembly 174 cushion one another with hydraulic subassembly 176 dampening the rebound of air spring subassembly 174. It is worth mentioning here that the resultant spring forces of two springs disposed in an apparent series relationship with respect to one another is calculated as being equal to the product of their respective spring moduli, divided by the sum thereof.

Thus, in the case of the series alignment of elastomer 142 and air spring subassembly 174, the resultant spring modules of the combination is equal to the product of their respective spring moduli, divided by the sum. However, in the case of suspension 10, where elastomeric assembly 66 is disposed in structural parallel relationship with respect to air spring assembly 56, their respective spring moduli are added arithmetically, with the sum thereof being equal to the modulus of the combination of the two. It is to be noted by the reader that when referring to the claims annexed hereto, the words "series" and "parallel" refer to the relative apparent disposition of these elements, as just described.

Reference to FIGS. 3 and 4 should make it apparent to the reader that increases in pressure within any of the series arrangement of hydraulic cylinder 158, hydraulic cylinder 234 and air spring cylinder 182 will result in a redistribution of this pressure according to hydraulic principles such that th load is equalized. In effect, this various pneumatic/hydraulic/elastomeric combination serves to supplement itself in its various components to accomplish the end set forth above. Reference to FIG. 4 will illustrate that hub portion 200 is free to move from left to right according to the distrubution of pressure, with sleeve member 210 likewise being able to move as a result of the presence of low-friction liners 214 and 218. Each of cylinder members 182, 234, and 158 are able to fold over upon themselves to facilitate this relative movement durin th equalization of pressures. The presence of hydraulic line 166 between the spring means and actuating assembly 140 and the remote spring means assembly 172 provides for the ability to hydraulically equalize pressures.

Figure 5:
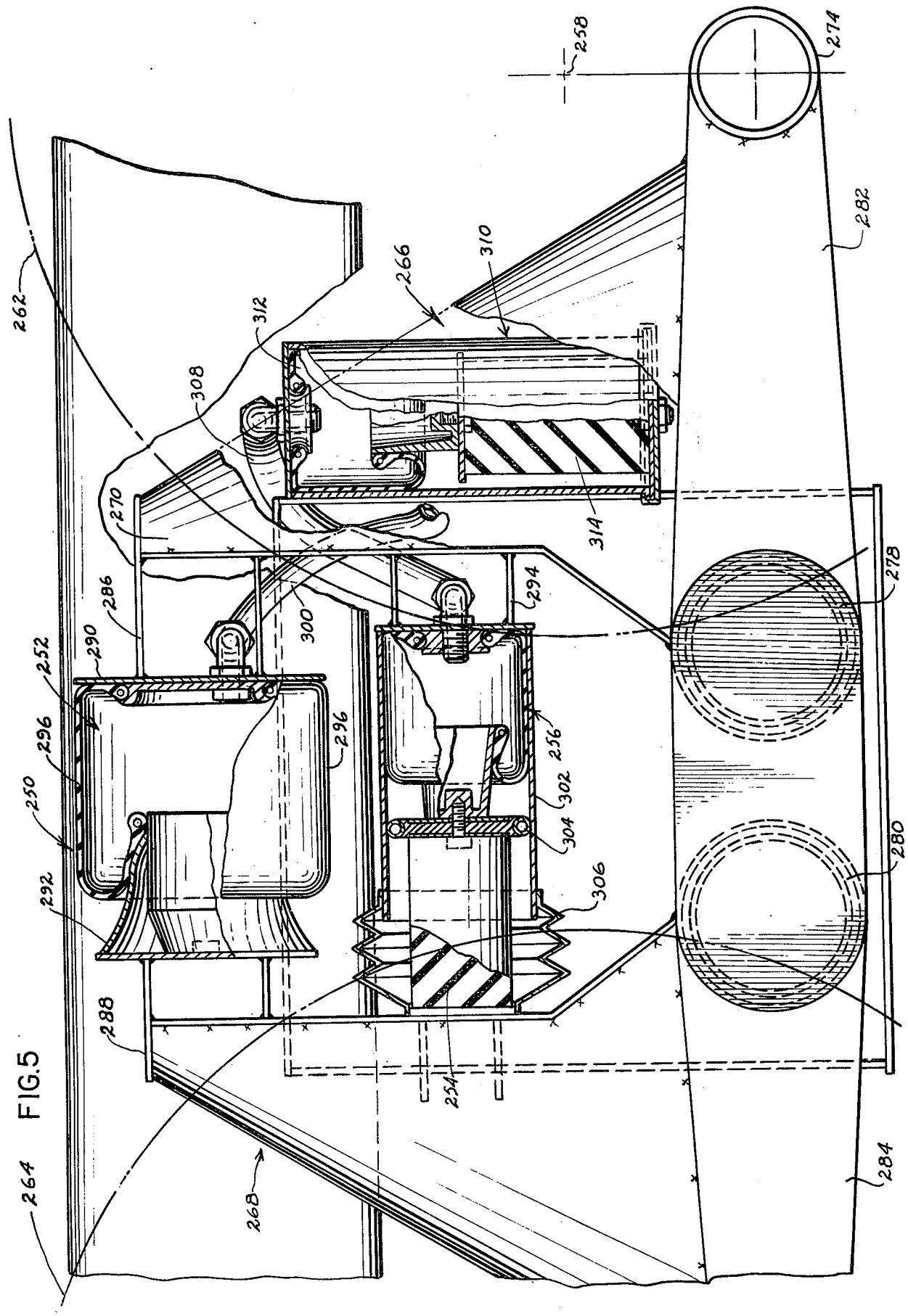
FIG. 5 is a fragmentary sectional elevational view of another embodiment of this invention, wherein an air spring is utilized in parallel with a combination elastomer-hydraulic cylinder arrangement which, in turn, functions in series with a remote hydraulic/elastomer spring assembly.

The reader is now referred to FIG. 5 of the drawings wherein, in a sectional elevational-type view, a suspension system 250 is shown consisting of the combination of an air spring assembly 252 located in parallel relationship with respect to the subcombination of a first elastomeric member 254 in series with hydraulic cylinder 256. This combination is shown present within a suspension system 250 which includes a pair of axles 258 and 260 which are spaced longitudinally along the axis of the vehicle with supporting wheels 262 and 264 shown in phantom outline.

As has already been described for suspension system 10 hereinabove, suspension system 250 consists of an over-all structure which includes rocker beam assemblies 266 and 268, each possessing beams 270 and 272, respectively. Beams 270 and 272 are trunnion in bushing assemblies 274 and 276, respectively, with each of these bushing assemblies being carried by suitable hanger brackets of the types illustrated in previous of my patents and referrd to generally as axle hanger brackets.

Referring to the makeup of the structure of rocker beam assemblies 266 and 268, it can be seen in FIG. 5 that a horizontal component rocker beam member 282 interconnects by a welded attachment bushing assembly 274 and a trunnion assembly 278. Similarly, a horizontal component rocker beam member 284 interconnects bushing assembly 276 with a trunnion assembly 280. Bushing assemblies 274 and 276 lie along a common center line with trunnion assemblies 278 and 280.

Rocker beams 270 and 272 further include inwardly extending members 286 and 288 which extend toward one another and are integral with opposite end plates 290 and 292. Also attached at least to rocker beam 270 is an inwardly projecting member 294.

All of the structural elements that have been described so far are preferably welded together, using continuous welds which exhibit the full strength characteristics of the base metals.

Referring now to the spring means of suspension means 250, air spring assembly 252 consists of a rolling-sleeve air spring wherein a rolling diaphragm 296 is in contact with its cooperative relatively fixed opposing member 298. Rolling diaphragm 298, at its opposite end, engages plate 290, through which a pneumatic line 300 supplies air that will enable air spring 252 to exert 3600 pounds in a 9-inch stroke.

Referring now th the combination of elastomer 254 and its associated series hydraulic cylinder 256, we see that an outer sleeve 302 serves to confine the movable roller bushing assembly 304 to which the right end of elastomer 254 is secured. The leftmost end of elastomer 254 is bonded to a plate which is integral with rocker beam 272.

A pleated or accordion-like boot 306 is secured both to rocker beam 272 and to sleeve 302 so as to keep dirt and other matter from the confines of sleeve 302.

Without being specifically shown, bushing assembly 304 preferably includes eight rollers which are supported within slots such that the outer surfaces of the rollers engage the inner surfaces of sleeve 302 in a relatively frictionless manner. It is comtemplated that these rollers be captively held by a plastic body, and that they be impregnated with graphite.

Hydraulic cylinder 256 is interconnected by a hydraulic line 308 to assembly 310 which is located remotely from hydraulic cylinder 256. Assembly 310 consists of a second hydraulic cylinder 312 in series with a second elastomer 314.

Thus, as seen in FIG. 5, suspension system 250 includes an arrangement able to accommodate critical dampening and frame deflection control. As has already been described, the combination of an air spring 252 in parallel with a first elastomer 254 between rockers 270 and 272 and a first hydraulic cylinder 256 is provided wherein the hydraulic cylinder 256 is located adjacent to and in series with elastomer 254. Assembly 310 consisting of a second hydraulic cylinder 312 and an elastomer 314 in series with cylinder 312 is disposed remotely from hydraulic cylinder 256, but interconnected by a hydraulic line 308 therebetween. Elastomers 254 and 314 function in series to cushion the impacts on the momentarily inert hydraulic masses of hydraulic cylinders 256 and 312 which, in turn, move in predetermined velocities to dampen the movement of the rockers 270 and 272.

An optional arrangement of FIG. 5 elements enabling maximum resistance to rebound without increasing spring rate would dispose the hydraulic cylinder assembly 256 (with sleeve 302, bushing assembly 304 and boot 306) in parallel relation to elastomer 254, and within double opposing traces, so that said cylinder 256 is compressed when elastomer 254 is operationally free, and when remote elastomer 314 will then provide a negative effect on the spring rate of the combined spring means.

In this case, the metered resistance to hydraulic flow alone will dampen compressive impacts on the spring means, while resistance to rebound will comprise the additional resistance of elastomer 314. "Within double opposing traces" is herein defined as attaching th left end of hydraulic cylinder assembly 256 to the right rocker beam and attaching the right end of hydraulic cylinder assembly 256 to the left rocker beam, thus reversing the action in the spring means (elastomer 254 and air spring 252).

The hydraulic damping means referred to herein may optionally comprise any hydraulic transfer system, whether confined within one, or more than one separate confinement vessels (or spaces).

The hydraulic damping means may be disposed in series, or in parallel relation to said air spring.

The present invention has been described in sufficient detail to enable one of ordinary skill in the art to make and use same. Obviously, modifications and alterations of the aforedescribed preferred embodiments of my invention will occur to others upon a reading and understanding of the specification and drawings, and it is my intention to include all such modifications and alternations as part of my invention, insofar as they come within the proper scope and spirit of the invention as defined by the appended claims.

What is claimed is:

1. A multiple axle vehicle suspension structure, comprising, in combination: transversely extending axles spaced from one another longitudinally with respect to the longitudinally axis of said vehicle suspension structure, frame members spaced transversely with respect to one another and extending between said axles, opposing rocker beam assemblies separately trunnioned in said structure at an elevation beneath the elevation of said frame members, said opposing rocker beam assemblies being pivotally supported at longitudinally extending ends thereof by said axles, multiple spring means reactive with respect to said axles for operationally equalizing the load as between said axles, said multiple spring means comprising a primary spring subassembly disposed intermediate and cooperative with upstanding and opposing faces on each of said opposing rocker beam assemblies, and a second subassembly responsive to said primary spring subassembly, said multiple spring means comprising an elastomeric member disposed between upstanding and opposing faces of said rocker beam assemblies, an air spring disposed remotely from said elastomeric member within said suspension structure and transversely between said axles, an hydraulic subassembly responsive to said elastomeric member and said air spring, said elastomeric member serving to dampen road-induced excitations of said axles and said hydraulic subassembly serving to damper excitations induced within said air spring, said multiple spring means further comprising a seperable canister assembly including at least two portions, a first of said canister portions being integral with the suspension structure, a second of said portions being removable from said first portion, a first end of said air spring being integral with said first canister portion, a second end of said air spring movable with respect to said first end of said air spring and being integral with one face of a bolt plate, an opposite face of the bolt plate being integral with a movable end of said hydraulic subassembly, an axially opposite end of said hydraulic subassembly being integral with a spacer member integral with said second removable canister portion, a sleeve member integral with said bolt plate and extending substantially coaxially about said hydraulic subassembly, a first relatively low-friction liner disposed internally between said sleeve member and said spacer member, a second relatively low friction liner disposed externally of said sleeve member and between the sleeve member and said removable canister, whereby substantially axial alignment between said air spring and said hydraulic subassembly is preserved during their operational working stokes.

2. A multiple axle vehicle suspension structure according to claim 1, wherein said air spring is disposed at an elevation below the top of said frame members and substantially vertically over the points said rocker beam assemblies are trunnioned, said elastomeric member being disposed at an elevation below and in parallel functional relationship with said air spring.

* * * * *